United States Patent [19]

Yoshie et al.

[11] Patent Number: 5,440,095
[45] Date of Patent: * Aug. 8, 1995

[54] APPARATUS FOR MANUFACTURING METAL TUBE COVERED OPTICAL FIBER CABLE AND METHOD THEREFOR

[75] Inventors: Yasunori Yoshie; Takashi Tsukui, both of Tokyo, Japan

[73] Assignee: NKK Corporation, Tokyo, Japan

[*] Notice: The portion of the term of this patent subsequent to Aug. 31, 2010 has been disclaimed.

[21] Appl. No.: 78,574

[22] Filed: Jun. 17, 1993

Related U.S. Application Data

[63] Continuation of Ser. No. 730,891, Jul. 26, 1991, Pat. No. 5,241,153.

[30] Foreign Application Priority Data

Dec. 5, 1989 [JP] Japan ................................. 1-314295
Jul. 20, 1990 [JP] Japan ................................. 1-190714

[51] Int. Cl.$^6$ ............................................. B23K 26/00
[52] U.S. Cl. ........................... 219/121.63; 219/121.64; 385/109
[58] Field of Search ..................... 219/121.63, 121.64, 219/121.85; 385/109, 111

[56] References Cited

U.S. PATENT DOCUMENTS 4,759,487 7/1988 Karlinski ...................... 219/163 X

FOREIGN PATENT DOCUMENTS 64-35514 2/1989 Japan .

*Primary Examiner*—Mark H. Paschall
*Attorney, Agent, or Firm*—Frishauf, Holtz, Goodman & Woodward

[57] ABSTRACT

An apparatus for manufacturing a metal tube covered optical fiber cable, having an assembly (2) consisting of a plurality of roller pairs for forming a metal strip (1) subjected to traction and causing both side edges of the metal strip to abut against each other to form a metal tube, a laser welding device (7) for radiating a laser beam on abutment portions of the metal tube to bond the abutment portions, thereby obtaining a sealed metal tube (1c), and an optical fiber guide means (6) for guiding an optical fiber (5) into the formed metal tube (1a), wherein the laser welding device (7) determines a focal point shift amount so that a rear bead width determined by an outer diameter and a wall thickness of the metal tube falls within a predetermined range, and laser welding is performed at a welding rate corresponding to the determined focal point shift amount.

6 Claims, 14 Drawing Sheets

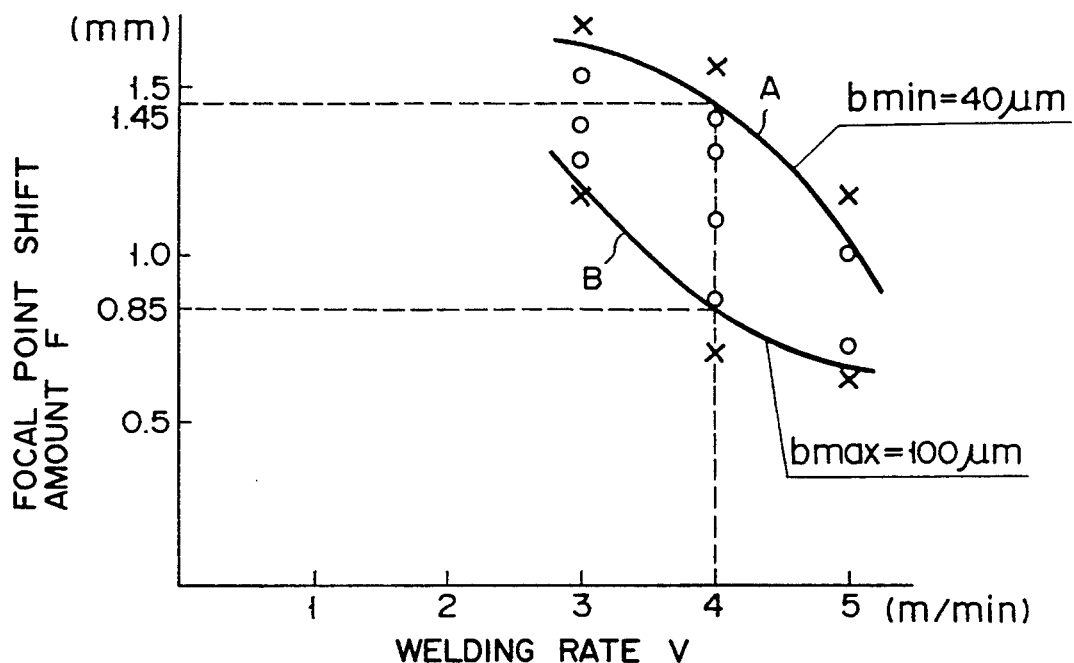
F I G. 11
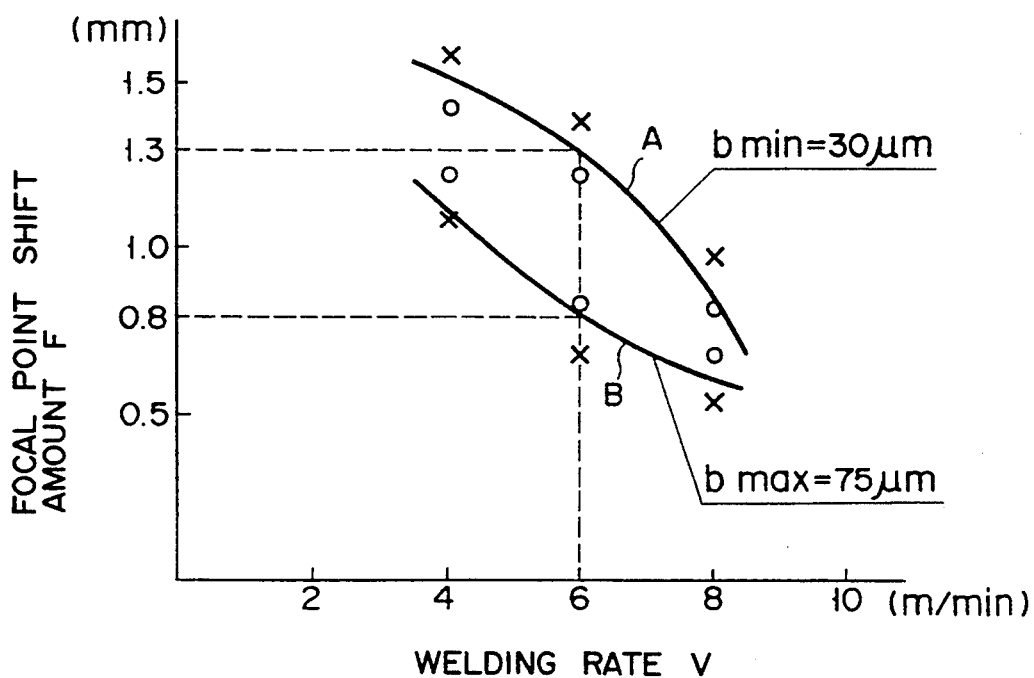
F I G. 12

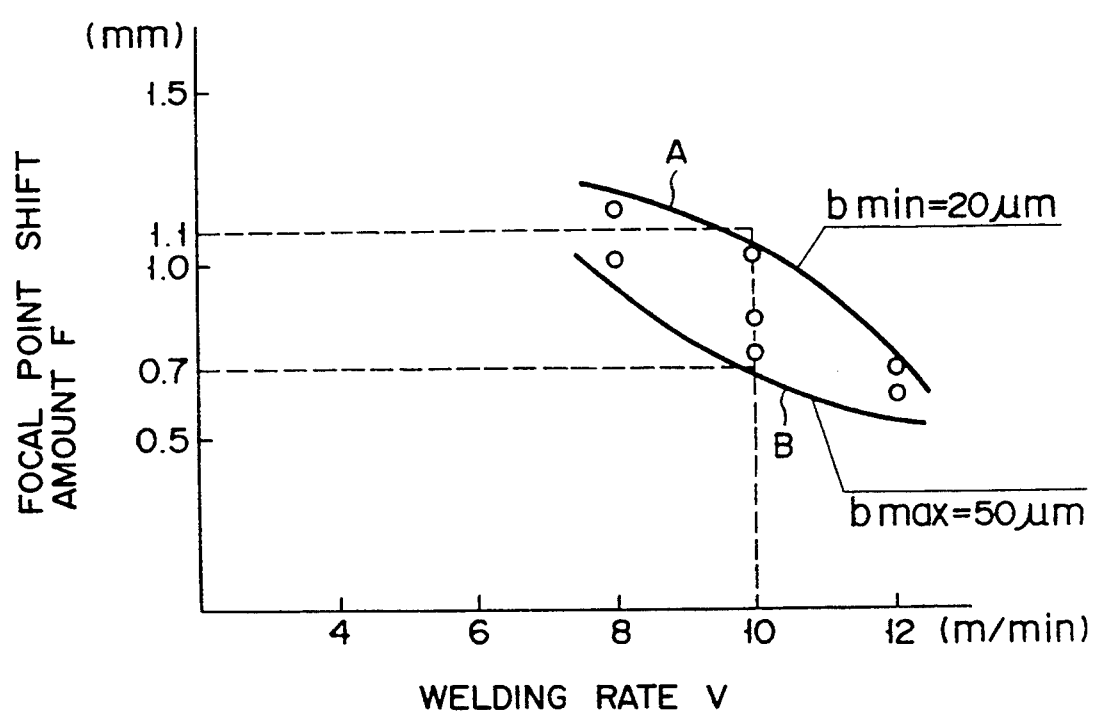
F I G. 13

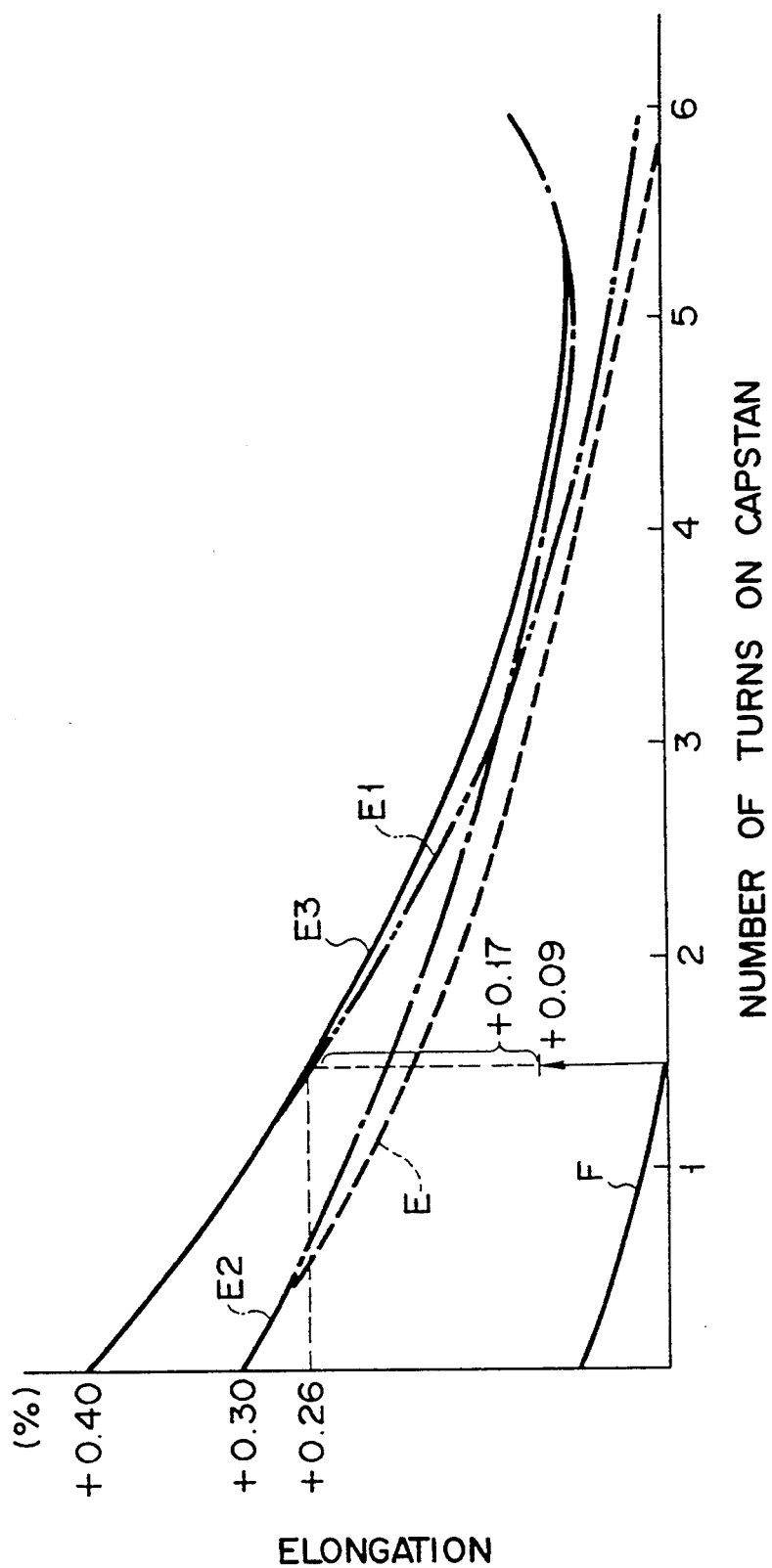
F I G. 16

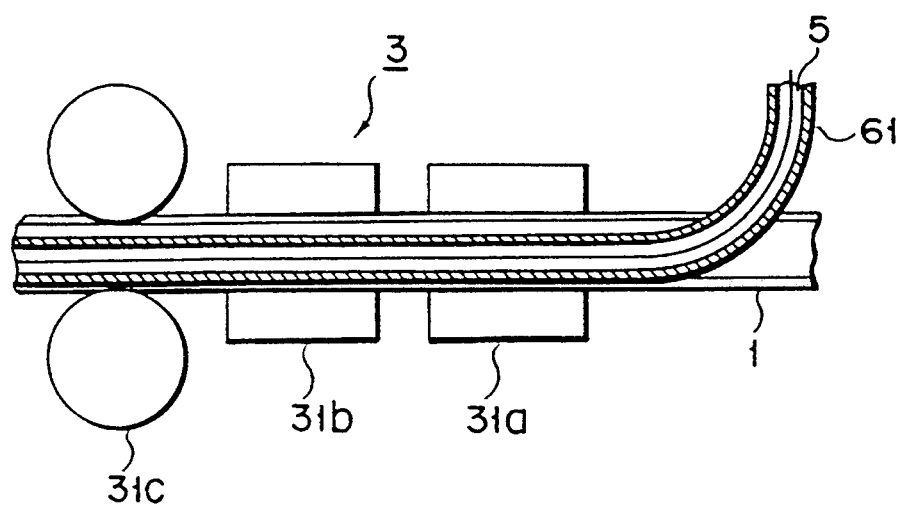
F I G. 18

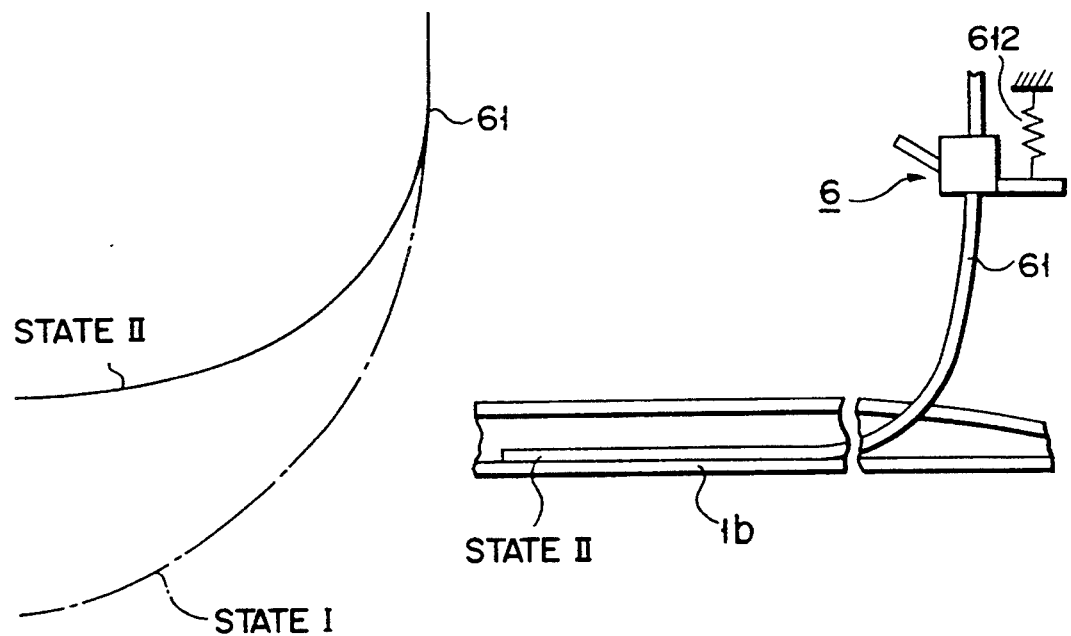
F I G. 21A
F I G. 21B
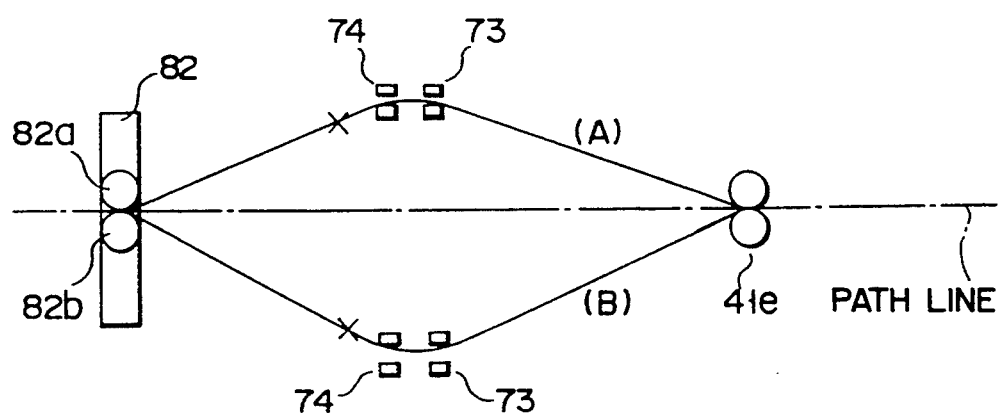
F I G. 22

APPARATUS FOR MANUFACTURING METAL TUBE COVERED OPTICAL FIBER CABLE AND METHOD THEREFOR

This is a continuation of application Ser. No. 07/730,891 filed Jul. 26, 1991 now U.S. Pat. No. 5,241,153, issued Aug. 31, 1993.

TECHNICAL FIELD

The present invention relates to an apparatus for manufacturing a metal tube covered optical fiber cable and a method therefor.

BACKGROUND ART

An optical fiber and a bundle of optical fibers are variously modified in accordance with the conditions under which they are used. However, a tension member must be used with an optical fiber to assure a high strength in some cases. When water permeates an optical fiber cable, its strength may be degraded. When an optical fiber cable is to be installed in the bottom of a sea or the bottom of the water, in order to assure a sufficient installation tension and a high water resistance, an optical fiber cable must be used in a jacket structure in which an optical fiber cable is covered with a thin metal tube.

When an optical fiber cable having a small diameter is to be conventionally covered with a metal tube, an optical fiber is inserted into a metal tube having a longitudinal gap, and this gap is bonded by soldering.

According to this method, however, heat generated during bonding of the gap of the metal tube is applied to the optical fiber cable for a relatively long period of time to cause thermal damage.

In order to prevent this optical fiber cable from thermal damage, there is provided an apparatus and method of welding abutment portions of a metal tube with a focused laser beam to continuously manufacture a metal tube covered optical fiber cable, as disclosed in Published Unexamined Japanese Patent Application No. 64-35514.

This apparatus for manufacturing the metal tube armored optical fiber cable forms a continuously fed flat metal strip into a metal tube having a longitudinal gap at a top portion. A guide tube is inserted into the metal tube through this gap of the metal tube, and an optical fiber is guided into the metal tube through the guide tube. After the gap of the metal tube having received this optical fiber is closed, the metal tube is supplied to a laser welding unit.

The laser welding unit causes a guide roller to align the abutment edge portions of the top portion of the metal tube to each other. A laser beam having a focal point at a position outside the range of the abutment portions is radiated to weld the abutment portions. Since the laser beam is focused outside the range of the abutment portions, the abutment portions can be welded without protecting the optical fiber with a heat-shielding member.

This metal tube containing the optical fiber cable is drawn to have a predetermined outer diameter, and the drawn tube is continuously wound around a capstan.

During drawing of this metal tube, an inert gas is supplied to the guide tube to carry the optical fiber cable by the viscosity resistance of the gas. While the metal tube is kept engaged with the capstan, the optical fiber cable is blown outward against the inner surface of the metal tube, so that the length of the optical fiber cable is set larger than that of the metal tube. The optical fiber cable is not kept taut to prevent the optical fiber cable from stress caused by an installation tension or the like.

In order to protect the optical fiber cable from water entering from a hole formed in a damaged metal tube, a gel is injected inside the metal tube. More specifically, after the optical fiber cable is blown outward against the inner surface of the metal tube by the inert gas at the capstan, the gel is injected from a gel guide tube different from the guide tube for guiding the optical fiber cable.

In the above conventional apparatus for manufacturing a metal tube armored optical fiber cable, any heat-shielding member for protecting the optical fiber is not used at the time of welding of the abutment portions of the metal tube, and the position of the guide tube for guiding the optical fiber cable is indeterminate, for this reason, the guide tube is located near the abutment portions of the metal tube. Therefore heat generated during laser welding is undesirably applied to the optical fiber cable to thermally damage the optical fiber cable. For example, when a temperature of the optical fiber cable near the abutment portions during laser welding is measured, a temperature near the optical fiber cable is increased to at least about 600° C. For this reason, a fine crystal nucleus is formed and is grown to undesirably cause a devitrification phenomenon in which a scattering loss is increased.

Sputter components are produced during welding. When the guide tube is close to the abutment portions, the sputter components deposited on the guide tube tend to be brought into contact with a rear bead of the welded portion. When the sputter components are brought into contact with the rear surface of the welded portion, the welded portion is thermally unbalanced to cause incomplete connection. In order to prevent this incomplete welding caused by the sputter components, when production of the rear bead portion as a sputter source is suppressed, a nonwelded portion is undesirably formed. When the guide tube is kept in contact with the abutment portions, the same phenomenon as in incomplete welding caused by the sputter components occurs. For these reasons, it is undesirably impossible to perform a continuous manufacturing operation (operation for manufacturing a long cable) in practice.

When a radiation power density of a laser beam is excessively high during laser welding, the metal tube is heated to a temperature exceeding its melting point and is partially evaporated or removed to form a hole in an irradiated portion. In order to prevent this, a laser beam is not conventionally focused within the range of the wall thickness of each abutment portion of the metal pipe, but is focused above the surface of the metal tube. When the laser beam is focused above the metal tube, the welded portion has a section in which the lower portion is sagged, so that a shrinkage hole and a crack tend to be formed inside the welded portion. In addition, an amount of sputter components is also increased, resulting in inconvenience.

DISCLOSURE OF INVENTION

The present invention has been made to solve the above drawbacks, and has as its object to provide an apparatus for manufacturing a metal tube covered optical fiber cable and a method therefor, capable of accurately welding abutment portions of a metal tube, preventing damage to the fiber cable during welding, and allowing a continuous operation for a long period of time.

According to the present invention, there is provided an apparatus for manufacturing a metal tube covered optical fiber cable, comprising an assembly consisting of a plurality of roller pairs for forming a metal strip subjected to traction and causing both side edges of the metal strip to abut against each other to form a metal tube, laser welding means for radiating a laser beam on abutment portions of the metal tube to bond the abutment portions, thereby obtaining a sealed metal tube, and optical fiber guide means for guiding an optical fiber or optical fiber bundle into the formed metal tube, characterized in that the laser welding means determines a maximum value of a focal point shift amount (defocus amount) of a laser beam emitted from laser radiation means in accordance with a minimum value of a rear bead width determined by an outer diameter of the metal tube, and determines a minimum value of the focal point shift amount by a maximum value of the rear bead width determined by a wall thickness of the metal tube, the determined maximum and minimum values of the focal point shift amount set a welding rate, and the laser beam is radiated while focal point shifting (defocusing) is being performed within a range of the focal point shift amount.

In this case, the apparatus preferably comprises drawing means for reducing the outer diameter of the sealed metal tube, and traction means for continuously drawing the metal strip, the formed metal tube, and the sealed metal tube incorporating the optical fiber or optical fiber bundle through the assembly, the optical fiber guide means, the laser welding means, and the drawing means.

In addition, the optical fiber guide means preferably comprises a guide tube inserted into the metal tube during formation and elastically urged against an inner wall at a position opposite to a radiation surface of the metal tube with respect to the laser beam radiation position.

Furthermore, the laser radiation means in the laser welding means is preferably positioned so that a focal point of the laser beam falls inside the metal tube.

According to the present invention, there is also provided a method of manufacturing a metal tube covered optical fiber cable, comprising the forming step of forming a metal strip subjected to traction into a metal tube through a forming roller, the laser welding step of welding abutment portions of the metal tube with a laser beam to obtain a sealed metal tube, and the optical fiber guide step of guiding an optical fiber or optical fiber cable into the metal tube, characterized by comprising determining a maximum value of a focal point shift amount of a laser beam emitted from laser radiation means in accordance with a minimum value of a rear bead width determined by an outer diameter of the metal tube, determining a minimum value of the focal point shift amount by a maximum value of the rear bead width determined by a wall thickness of the metal tube, setting a welding rate in accordance with the determined maximum and minimum values of the focal point shift amount, and radiating the laser beam while focal point shifting is being performed within a range of the focal point shift amount.

In addition, the method preferably comprises elastically urging a guide tube inserted into the metal tube during formation against an inner wall at a position opposite to a radiation surface of the metal tube with respect to a laser beam radiation position.

Furthermore, the focal point shifting preferably comprises causing a focal point of the laser beam to fall inside the metal tube.

According to the present invention, the optical fiber cable is guided by the guide tube also serving as a heat-shielding member into the covering metal tube. At the laser beam radiation position, the guide tube is elastically urged against the inner wall of the metal tube at a position opposite to the abutment portions of the metal tube, thereby reducing the heat influences on the optical fiber cable.

The maximum value of the focal point shift amount of the laser beam emitted from laser radiation means is determined in accordance with the minimum value of the rear bead width determined by the outer diameter of the metal tube, the minimum value of the focal point shift amount is determined by the maximum value of the rear bead width determined by the wall thickness of the metal tube, the welding rate is set in accordance with the determined maximum and minimum values of the focal point shift amount, and the laser beam is radiated while focal point shifting is being performed within the range of the focal point shift amount. Therefore, welding can be performed at an optimal radiation power density corresponding to the size of the metal tube.

The focal point shifting is performed such that the focal point of the laser beam falls inside the metal tube. An excessive increase in radiation power density is prevented, and the welding width can be kept almost constant.

In addition, since the guide tube is located at a position opposite to the abutment portions of the metal tube at the laser welding portion, a gap is formed between the abutment portions and the guide tube, so that a space for allowing deposition of sputter components produced during welding can be assured.

BRIEF DESCRIPTION OF DRAWINGS

FIGS. 7A and 7B show a tension variable means and a tension adjusting means, respectively, in which FIG. 7A is a plan view thereof, and FIG. 7B is a front view thereof, FIGS. 11, 12, and 13 are graphs showing relationships between focal point shift amounts and welding rates, respectively, FIGS. 14, 15, and 16 and FIG. 17 are views for explaining extra length control operations, FIG. 18 is a view showing a part of another layout of the optical fiber guide means, FIG. 21A is a view for explaining a bent state of a guide tube, FIG. 21B is a view for explaining a guide tube positioning mechanism, and FIG. 22 is a view for explaining a positioning state of the metal tube at a welding position.

BEST MODE OF CARRYING OUT THE INVENTION

Figure 1:
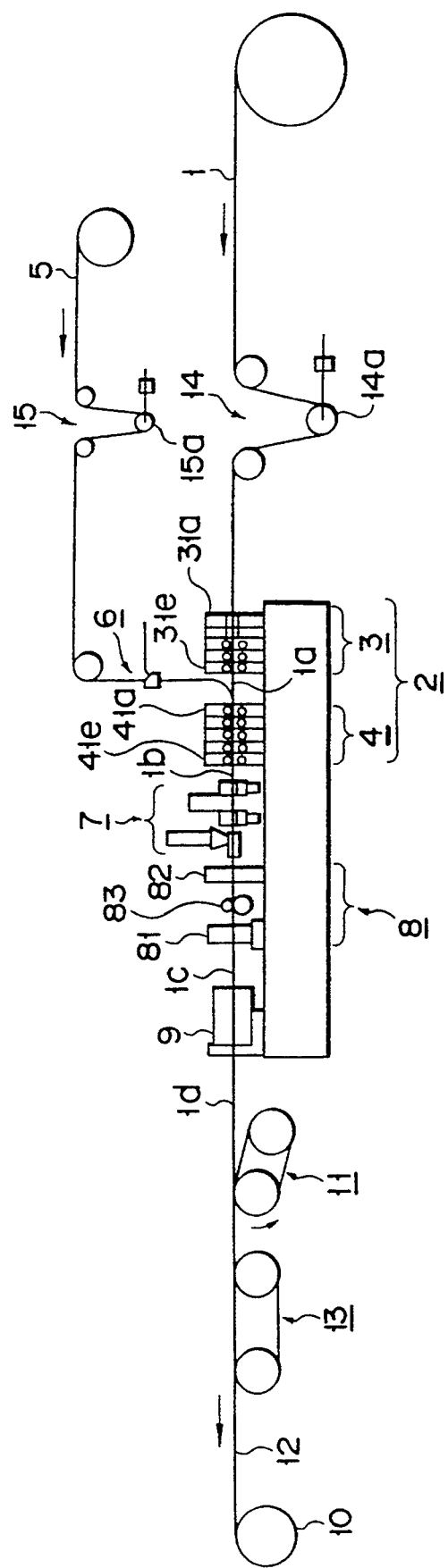
FIG. 1 is a view of an overall arrangement showing an embodiment of the present invention.

FIG. 1 is a view of an overall arrangement showing an embodiment of the present invention. As shown in FIG. 1, an apparatus for manufacturing a metal tube covered optical fiber cable comprises an assembly 2 constituted by first and second assemblies 3 and 4 for forming a metal strip 1 and forming the metal strip into a metal tube so as to abut both side edges of the strip, an optical fiber guide means 6, arranged between the first and second assemblies 3 and 4, for guiding an optical fiber cable 5 into the formed metal tube, and a laser welding means 7 arranged as the next stage of the assembly 2.

A measuring unit 8 and a drawing means 9 are arranged next to the laser welding means 7. A traction means comprising a tension variable means 11 and a tension adjusting means 13 for the metal tube covered optical fiber cable 12 is arranged between the drawing means 9 and a cable winding machine 10. The tension variable means 11, the tension adjusting means 13, and a tension adjusting means 14 for the metal strip 1 and a tension adjusting means 15 for the optical fiber cables, which latter two are arranged in the upstream of the assembly 2, constitute an extra length control means for controlling a so-called extra length, i.e., the length of the optical fiber cable relative to the metal tube.

Figure 2A:
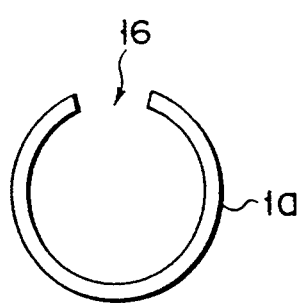
FIGS. 2A and 2B are sectional views showing a metal tube in different forming steps.
Figure 2B:
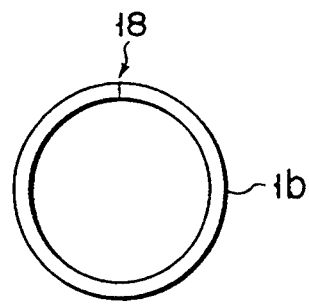

The first assembly 3 constituting the assembly 2 comprises a plurality (e.g., five) of roller pairs 31a to 31e continuously aligned with each other. The forming roller pairs 31a to 31e sequentially have different forming surfaces and form the continuously fed metal strip 1 into a substantially U-shaped metal tube 1a having a longitudinal gap at its top portion, as shown in a sectional view of FIG. 2A.

Figure 3A:
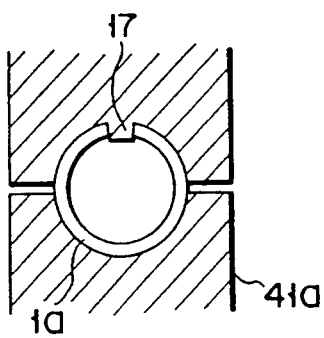
FIGS. 3A, 3B, and 3C are side views showing forming roller pairs of a second assembly.
Figure 3B:
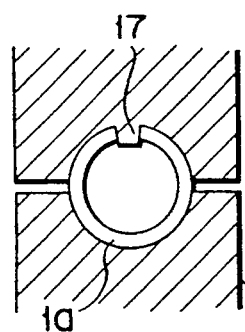
Figure 3C:
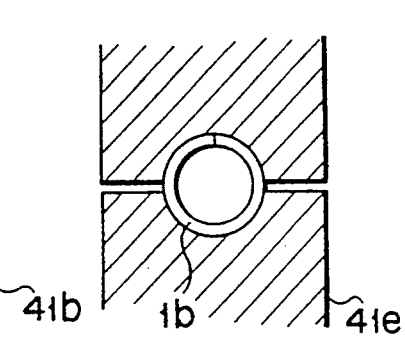

Similarly, the second assembly 4 comprises a plurality (e.g., five) of forming roller pairs 41a to 41e continuously aligned with each other. As shown in FIGS. 3A, 3B, and 3C, fins 17 gradually reduced in size are formed in the upper rollers corresponding to the forming roller pairs 41a to 41e of the previous stages. A gap 16 of the metal tube 1a is engaged with each fin 17 so that the gap 16 is located at the top point of the metal tube 1a and the gap 16 is gradually reduced by the fins 17. Abutment portions 18 of the metal tube 1a are brought into contact with each other by the forming roller 41e of the last stage, thereby forming a metal tube 1b almost tightly closed at the abutment portions 18.

Figure 4:
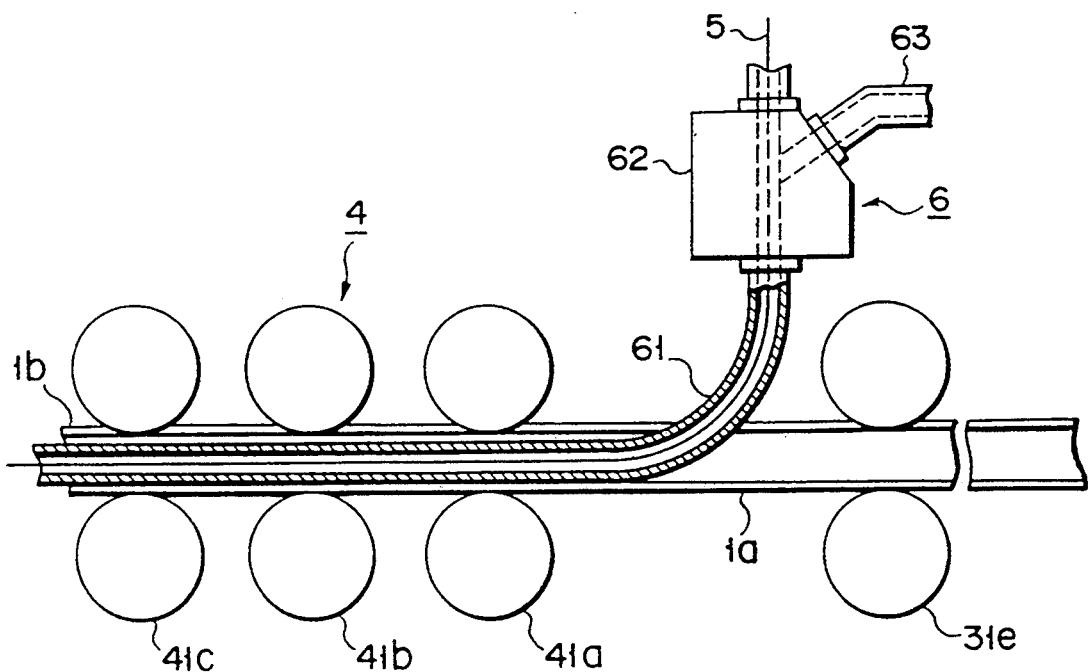
FIG. 4 is a view showing an arrangement of an optical fiber guide means.

As shown in a partial sectional view of FIG. 4, the optical fiber guide means 6 comprises a guide tube 61 inserted into the metal tube 1b to guide the optical fiber cable 5, and an inert gas supply tube 63 connected to the guide tube 61 through a tube connector 62 and an inert gas supply tube connector 62.

The guide tube 61 is made of a metal excellent in thermal conductivity, such as copper or a copper alloy. The outer diameter of the guide tube 61 is smaller than the inner diameter of the metal tube 1b. The guide tube 61 is inserted from the gap 16 of the metal tube 1 between the first and second assemblies 3 and 4. A distal end of the guide tube 61 passes through the laser welding means 7 and is located in front of a eddy current probe 81 of the measuring unit 8. The distal end of the guide tube 61 is inserted in front of the eddy current probe 81 as described above because probe precision is adversely affected when the guide tube 61 reaches the eddy current probe 81.

When a probe measurement result is not adversely affected by insertion of the guide tube 61 passing through the eddy current probe 81, for example, when the diameter of the metal tube is large and the guide tube 61 is in contact with the inner wall surface of the metal tube at a position opposite to a probe position, the guide tube 61 may be inserted and reaches a position passing through the position of the eddy current probe 81, that is, it may be inserted in front of the drawing means 9.

Figure 19:
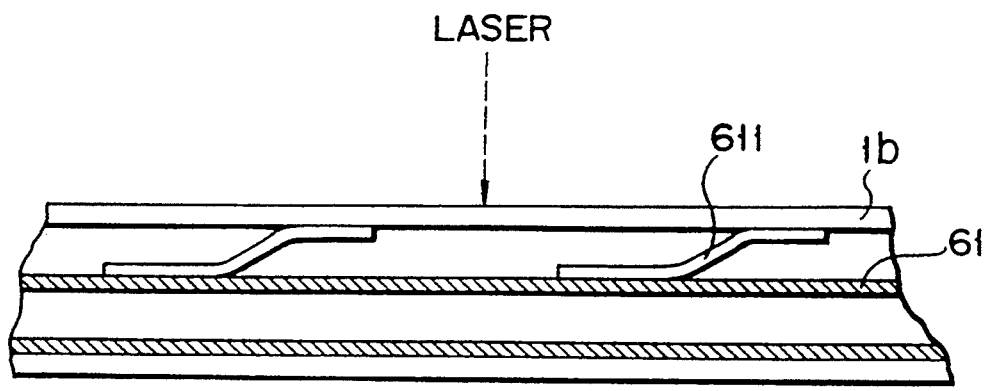
FIG. 19 is a view for explaining a leaf spring mechanism.
Figure 20:
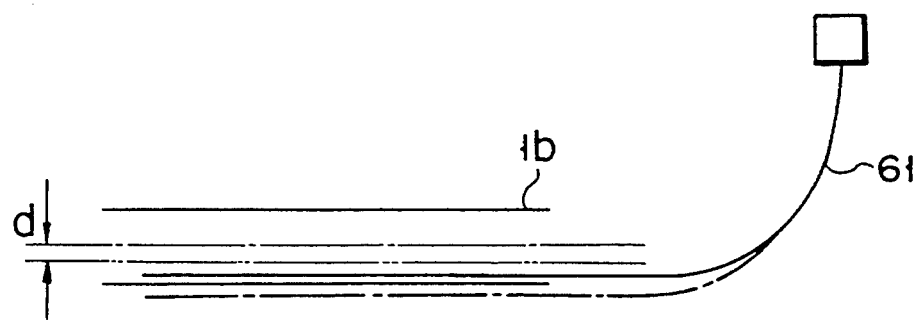
FIG. 20 is a view for explaining a state in which the metal tube is kept at an upper position.

The guide tube 61 can be provided with a leaf spring mechanism 611 (FIG. 19) facing upward in front of and/or behind the laser beam radiation position of the laser welding means 7 and elastically contacting the inner wall surface of the metal tube 1b, or as shown in FIG. 20, the metal tube 1b is located at a position higher by a predetermined distance in front of and/or behind the laser beam radiation position. Alternatively, a downward elastic force is applied to the guide tube 61 itself to bring the guide tube 61 into contact with the inner wall of the metal tube 1b at a position opposite to the laser beam radiation position.

Elastic contact between the guide tube 61 and the inner wall of the metal tube 1b can be easily achieved, as shown in FIG. 21. The guide tube 61 is curved from a state I to a state II by elasticity of the guide tube 61 itself against the nature of straight extension of the guide tube 61 (FIG. 21(A)), the guide tube 61 is brought into contact with the inner wall of the metal tube 1b in the state II (FIG. 21(B)), and the optical fiber guide means 6 is fixed at an appropriately position to maintain a curved state. At this time, a positioning mechanism 612 constituted by a spring mechanism or the like is preferably added to the optical fiber guide means 6, as needed.

When the metal tube 1b is to be located at a position higher by the predetermined distance in front of the laser beam radiation position, a positioning unit 71 (to be described later) is finely adjusted. On the other hand, when the guide tube 61 is located at a position higher by the predetermined distance behind the laser beam radiation position, a support roll stand 82 (to be described later) is finely adjusted.

Figure 5:
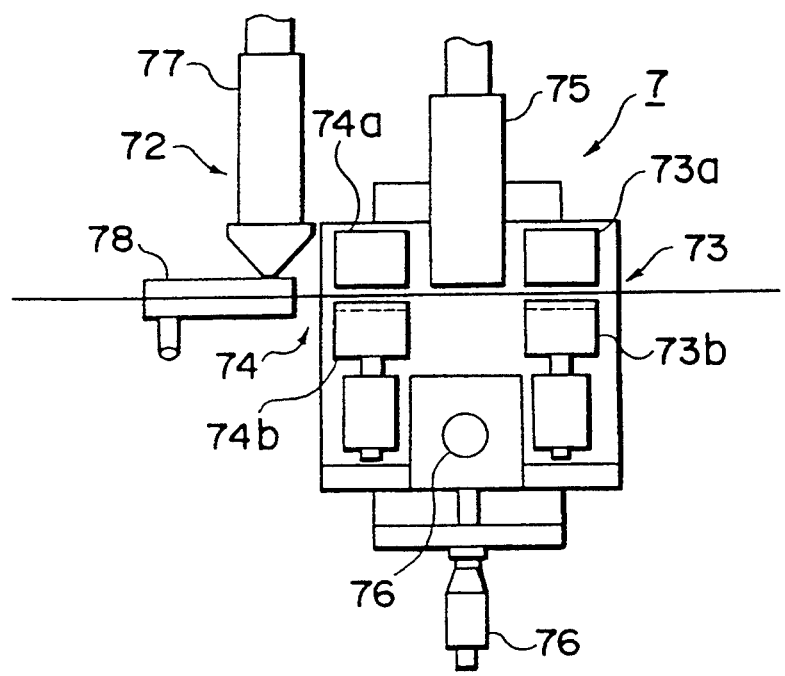
FIG. 5 is a view showing an arrangement of a laser welding means.

As shown in the arrangement of FIG. 5, the laser welding means 7 comprises a positioning unit 71 for positioning the metal tube 1b and a laser welding unit 72.

The positioning unit 71 comprises, e.g., two sets of guide shoes 73 and 74, a CCD seam monitor 75 arranged between the guide shoes 73 and 74, and micrometers 76 for finely adjusting vertical and horizontal positions of the guide shoes 73 and 74.

Figure 6:
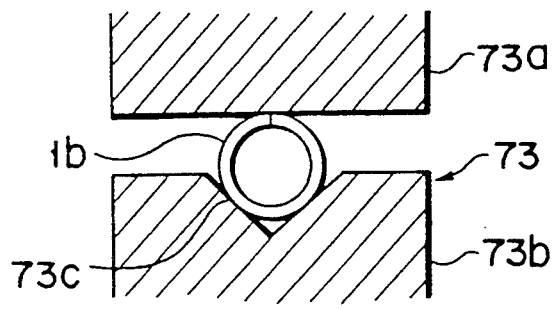
FIG. 6 is a side view showing a guide shoe.

The guide shoe 73 (74) comprises an upper shoe 73a (74a) and a lower shoe 73b (74b), as shown in the side view of FIG. 6. The upper shoe 73a (74a) has a flat surface which is brought into contact with the metal tube 1b. The lower shoe 73b (74b) has, e.g., a V-shaped groove engaged with the metal tube 1b and is biased upward by a spring.

The laser welding unit 72 comprises a laser radiation means 77, and a gas seal means 78 for sealing a welding position of the metal tube 1b with an inert gas such as argon gas.

The laser radiation means 77 is connected to, for example, a carbon dioxide laser device, guides and focuses a laser beam through an optical system, and emits the focused laser beam on the surface of the metal tube 1b at an angle of about 90°. A focal point of the laser beam radiated on the surface of the metal tube 1b is adjusted to be located at a position below the abutment portions 18 of the metal tube 1b, i.e., a position inside the metal tube 1b.

The measuring unit 8 arranged next to the laser welding means 7 comprises a support roll stand 82, a speedometer 83, and the eddy current probe 81 and checks a welded state or the like.

The drawing means 9 comprises a roller die and draws a welded and sealed metal tube 1c to have a predetermined outer diameter, thereby obtaining a thin metal tube 1d corresponding to the outer diameter of the optical fiber cable 5.

Figure 7A:
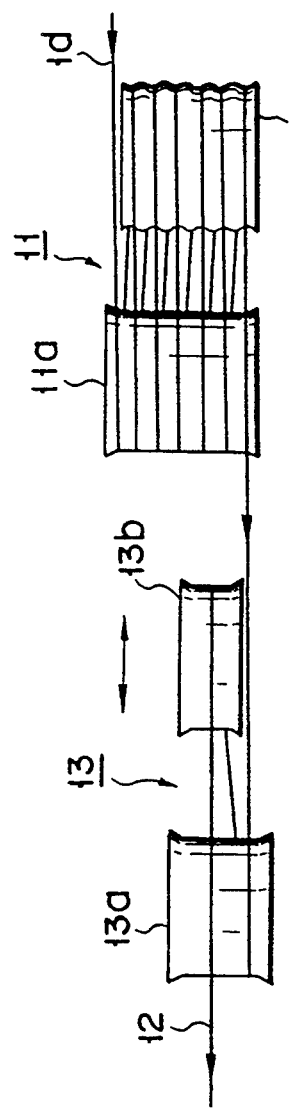
Figure 7B:
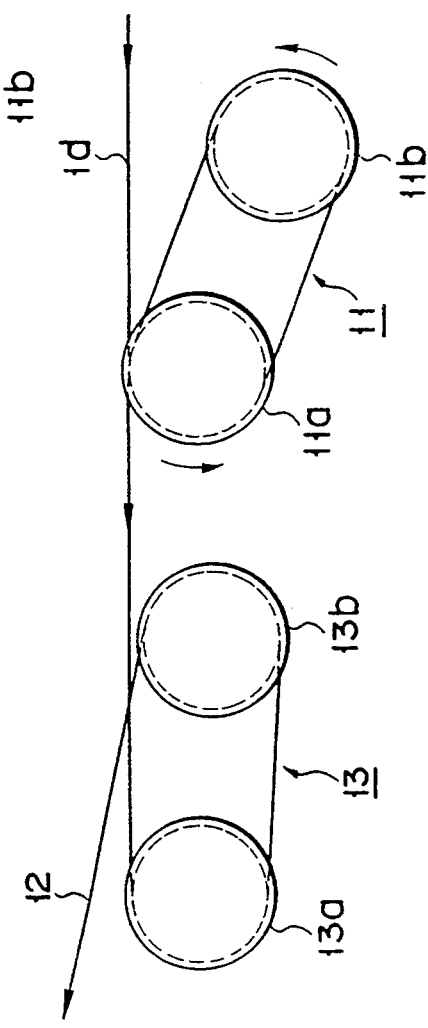

The tension variable means 11 arranged in the upstream of the drawing means 9 comprises a capstan having, e.g., a pair of rolls 11a and 11b, as shown in FIGS. 7A and 7B. The surface of one roll 11a is formed smooth, and the surface of the other roll 11b has a plurality of grooves. The metal tube 1d is wound around the capstan without overlapping the turns of the metal tube 1d. Similarly, the tension adjusting means 13 comprises a dancer roll stand having a pair of rolls 13a and 13b. One roll 13b is moved in a direction indicated by an arrow to change a distance between the rolls 13a and 13b, so that the tension is adjusted thereby adjusting a tension of the metal tube covered optical fiber cable 12 in the downstream of the capstan 11.

The tension adjusting means 14 and 15 for adjusting the tension of the metal strip 1 fed to the assembly 2 and the tension of the optical fiber cable 5 supplied to the optical fiber guide inlet of the guide tube 61 comprise dancer stands, respectively. The tensions of the dancer stands 14 and 15 are variably adjusted by moving weights linked to pulleys 14a and 15a engaged with the metal strip 1 and the optical fiber cable 5.

An operation of manufacturing the metal tube covered optical fiber cable 12 by the manufacturing apparatus having the above arrangement will be described in an order of manufacturing steps.

(1) Forming Step

The metal strip 1 is continuously supplied while the metal strip 1 is adjusted by the dancer stand 14 to have a predetermined tension. The first assembly 3 of the assembly 2 forms the supplied metal strip 1 into the metal tube 1a having the longitudinal gap 16 at the top portion. The metal tube 1a is supplied to the second assembly 4, and the gap 16 is sequentially engaged with the fins 17 of the forming roller pairs 41a and 41b and is gradually reduced to obtain the metal tube 1b whose abutment portions 18 are perfectly closed. When the metal tube 1b passes through the last forming roller pair 41e, a small gap 18a (to be described later) is actually formed between the abutment portions 18. The gap 18a was not changed in a path from the forming roller pair 41e to the laser beam radiation position, as detected by an another CCD monitor (not shown).

(2) Optical Fiber Cable Insertion Step

Meanwhile, the optical fiber cable 5 adjusted by the dancer stand 15 to have a predetermined tension is continuously supplied through the guide tube 61 which has been inserted from the gap 16 of the metal tube 1a between the first and second assemblies 3 and 4. At the same time, argon gas flows into the guide tube 61 from the inert gas supply tube 63 connected to the guide tube 61.

(3) Laser Welding Step

The metal tube 1b inserted into the guide tube 61 is supplied to the laser welding means 7. Since the metal tube 1b supplied to the laser welding means 7 is positioned by the fins 17 of the forming roller pairs 41a and 41b, the abutment portions 18 can be perfectly aligned with the position of the laser beam emitted from the laser beam radiation means 77.

The metal tube 1b supplied to the positioning unit 71 of the laser welding mean 7 is engaged with and guided along the grooves of the guide shoes 73 and 74. Lateral shifts, rotation and zig-zag movement of the metal tube 1b can be prevented. The positional deviations of the abutment portions 18 were observed on the CCD monitor 75. When a guide roller was used, the abutment portions 18 were moved within the range of ±100 μm due to torsion. However, when the guide shoes were used, the abutment portions were moved by only ±15 μm.

Subsequently, the CCD seam monitor 75 continuously detects the positions of the abutment portions 18 of the metal tube 1b, and the micrometer 76 is automatically or manually operated in accordance with a detection result to move the guide shoes 73 and 74, thereby finely adjusting that the abutment portions 18 are located at a predetermined position with respect to the focal point of the laser beam.

The role of the positioning unit 71 will be described below. As previously described, the guide shoes 73 and 74 in the positioning unit 71 prevent rotation and zig-zag movement of the metal tube 1b and guide, to the laser beam radiation position, the abutment portions 18 accurately positioned by the rollers 41a to 41d with fins with respect to the laser radiation position without causing zig-zag movement of the metal tube 1b. As previously described, it is possible to move the metal tube 1b upward by a predetermined distance in front of the laser beam radiation position upon adjustment of the positioning unit 71. As a result, elastically tight contact between the guide tube 61 and the inner wall surface of the metal tube 1b can be performed to minimize an adverse influence of laser welding (to be described later) and allow a continuous manufacturing operation for a long period of time.

As shown in FIG. 22, the positioning unit 71, i.e., the metal tube 1b is moved upward or downward by a predetermined distance or more (within the limit of elasticity) with respect to a path line by using the support rolls 82a and 82b of the support roll stand 82 and the final forming roller pair 41e as two support points, so that the metal tube 1b constitute two sides of a substantial triangle.

At this time, a light tension acts on the metal tube 1b located between the support roll stand 82 and the final forming roller pair 41e. This indicates that the positioning unit 71 also serves as a means for adjusting a tension of the metal tube (particularly 1c and 1d) as in the tension adjusting means 14 for the metal strip (to be described in detail later). Vibrations of the metal tube 1b at the laser welding position (marks X in FIG. 22) can be suppressed.

In practice, another CCD monitor (not shown) was located at a position inclined from the laser radiation position by 90° with respect to the CCD seam monitor 75 and the path line as the center, and vertical vibrations of the metal tube 1b were observed. As a result, when the guide shoes 73 and 74 in the positioning unit 71 are open, the metal tube 1b was vibrated in the range of about ±100 to about ±150 μm. However, when the metal tube 1b was fixed by the guide shoes 73 and 74, the metal tube 1b was vibrated within the range of about ±20 to about ±30 μm. When the positioning unit 71 adjusted as indicated by a state (A) or (B) in FIG. 22, the metal tube 1b was confirmed to be vibrated within the range of about ±5 μm.

When the elastic contact between the guide tube 61 and the inner wall surface of the metal tube 1b is taken into consideration, the positioning unit 71 is more preferably adjusted in the state (A) than the state (B).

With the above adjustment operations, highly precise welding control can be performed, adverse welding influences can be minimized, a long-term operation is allowed.

The metal tube 1b having abutment portions 18 whose positions are adjusted is supplied to the laser welding unit 72. The laser welding unit 72 radiates a laser beam from the laser radiation means 77 to weld the abutment portions 18 while supplying argon gas from the gas seal means 78 to the abutment portions 18 of the metal tube 1b. The inner surface of this welded portion is sealed by argon gas flowing within the guide tube 61 and reversely flowing from the distal end of the guide tube 61.

Before and after the laser beam radiation position, the guide tube 61 which guides the optical fiber cable 5 is located in elastic contact with the inner wall of the metal tube 1b at a position opposite to the laser beam radiation position, and a gap is formed between the inner surfaces of the abutment portions 18 and the guide tube 61. The optical fiber cable 5 is shielded from heat by means of this gap and the guide tube 61, thereby minimizing the thermal influence on the optical fiber cable 5.

When the guide tube 61 is to be located at a position opposite to the abutment portions of the metal tube at the laser welding portion, the positioning unit 71 can be adjusted to locate the metal tube 1b higher than the path line, and the layout of the guide tube 61 can be more flexible.

In addition, the optical fiber cable 5 is cooled by the argon gas flowing in the guide tube 61 and the argon gas reversely flowing from the guide tube 61, thereby minimizing a temperature rise of the optical fiber cable 5.

For example, when the guide tube 61 was in contact with the abutment portions 18 at the laser radiation position, the temperature near the optical fiber cable 5 heated to a temperature of 600° C. or more can become about 115° C. to about 135° C. due to the presence of the gap. When argon gas flowed in the guide tube 61, the temperature was further reduced to about 100° C.

When the above gap is formed, an adverse influence on welding, which is caused by sputter components deposited on the guide tube 61, can be lagged. Therefore, welding can be stably performed for a long period of time.

Since the laser beam emitted from the laser radiation means 77 is adjusted so that the focal position of the laser beam is set inside the metal tube 1b, an excessive increase in power density of the laser beam incident on the abutment portions 18 can be prevented, and stable welding can be performed. When the focal position is focused inside the metal tube 1b, and once a cavity is formed, a laser beam reflected by a cavity wall is focused toward the bottom of the cavity, so that a deep cavity is formed. A welding width can be set to be almost constant, and a rear bead width can be made small.

Since the focal point shift amount of the laser beam radiated with a predetermined power is controlled by setting the radiation power density to fall within the predetermined range, and the focal point shift amount, i.e., the welding rate is determined in accordance with the radiation power density, the rear bead width can be reduced to suppress the influences of sputter components.

A minimum value $b_{min}$ of the rear bead width is determined by a condition that nonwelded portions are not left in the abutment portions 18. A maximum value $b_{max}$ of the rear bead width is determined by the limit in which sputter influences do not occur in a long-term operation.

Figure 8:
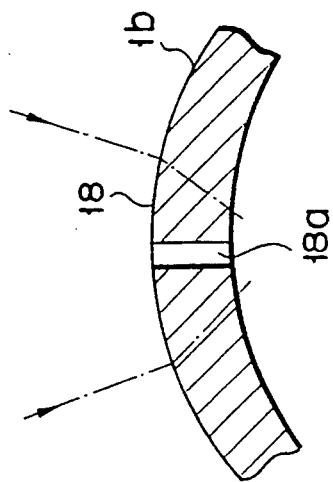
FIG. 8 is a view showing abutment portions of a metal tube.
Figure 9:
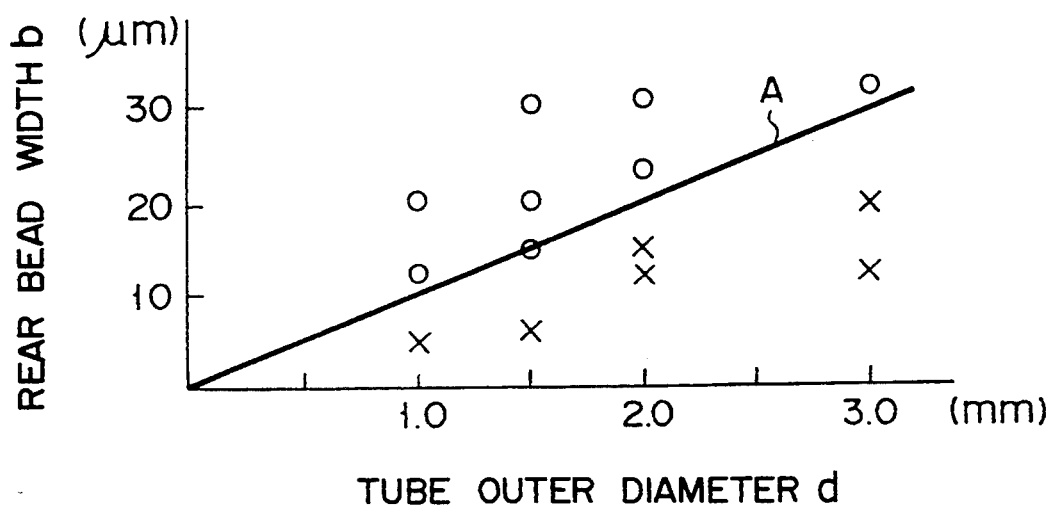
FIG. 9 is a graph showing a relationship between a tube outer diameter and a rear bead width.

Although the metal tube 1b is held by the guide shoes 73 and 74 at the position of the laser welding means 7, the small gap 18a is formed between the abutment portions 18 of the metal tube 1b by a spring back at the position of the laser welding portion 72, as shown in FIG. 8. The spring back which forms this small gap is influenced by rigidity of the metal tube 1b, i.e., an outer diameter d of the formed metal tube 1b. For example, a relationship between the outer diameter (mm) and the rear bead width b (μm) is examined and shown in FIG. 9 when a laser beam having a power of 400 (w) is incident in the small gap 18a while the metal tube 1b consisting of Fe-group stainless having a longitudinal modulus of elasticity of 18,000 (kg/cm$^2$) is perfectly fixed. The tube outer diameter d is plotted along the abscissa in FIG. 9, and the rear bead width b is plotted along the ordinate. Referring to FIG. 9, a circle indicates a portion where a nonwelded portion is not formed, and a cross indicates a portion where a nonwelded portion is formed. Therefore, a straight line A indicates the limit at which nonwelded portions are not formed. The straight line A is given as b=10d.

In an actual apparatus, according to the observation with the CCD seam monitor 75, a relative vibration of about ±5 (μm) was found to occur between the laser beam and the small gap 18a due to small vibrations of the apparatus.

The minimum width $b_{min}$ of the rear bead becomes 10d±5 (μm). For example, when the outer diameter of the metal tube 1b is 1 (mm), the minimum width $b_{min}$ of the rear bead becomes 20 (μm).

The minimum width $b_{min}$=10d±5 of the rear bead is exemplified with use of the metal tube 1b consisting of Fe-group stainless having the longitudinal modulus of elasticity of 18,000 (kg/mm$^2$). However, when Fe-group stainless or an Ni-group alloy having a longitudinal modulus of elasticity of more than 18,000 (kg/mm$^2$) is used, the rear bead width is set to be larger than the minimum width $b_{min}$, and good welding free from the nonwelded portions can be performed.

Figure 10:
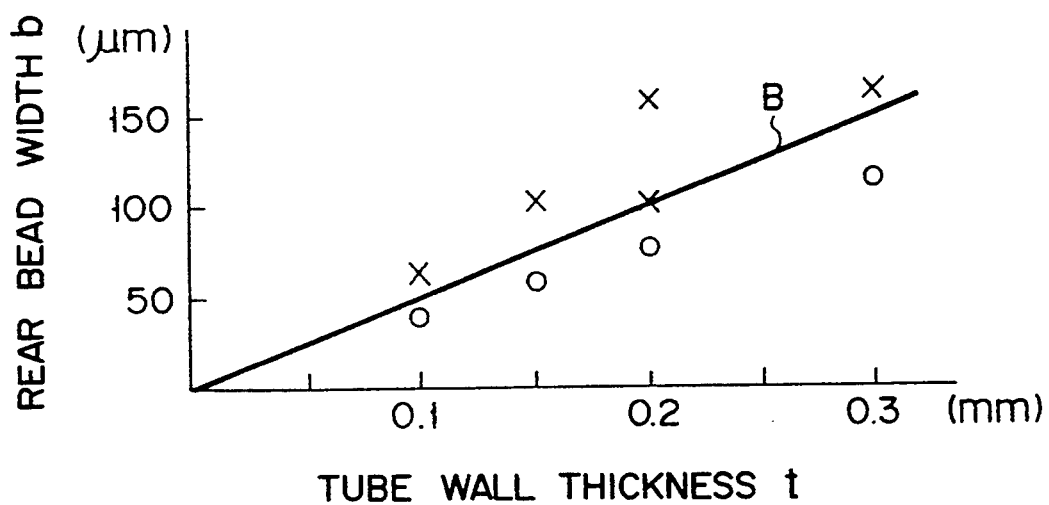
FIG. 10 is a graph showing a relationship between a tube wall thickness and a rear bead width.

The limit free from the sputter components even in a long-term operation is determined by a shape of a welding portion. A relationship between a tube wall thickness t (mm) and the rear bead width b (μm) is shown in FIG. 10 when a laser beam having a power of 400 (w) is emitted in the small gap 18a to perform welding. The tube wall thickness t is plotted along the abscissa of FIG. 10, and the rear bead width b is plotted along the ordinate. Referring to FIG. 10, a circle indicates a state wherein no sputter influence is found and welding can be continuously performed for a long period of time, e.g., 10 hours. A cross indicates a state wherein the sputter influence occurs and welding cannot be performed for a long period of time. The long period of time, i.e., 10 hours corresponds to a maintenance timing in an actual operation. This time does not indicate the limit time free from the sputter influence.

A straight line B indicates the limit free from the sputter influence even in an operation for a long period of time and is represented by $b=1000(t/2)$. when the tube wall thickness t is 0.1 (mm), an allowable maximum width bmin of the rear bead width can be 50 ($\mu$m).

As described above, when the laser beam having a power of 400 (w) is used, and the metal tube 1b has an outer diameter of 1 (mm) and a wall thickness of 0.1 (mm), the width b of the rear bead is controlled to fall within the range of 20 to 50 ($\mu$m) to perform welding. The sputter influence can be suppressed even if welding is performed for a long period of time. Therefore, welding free from defects can be continuously performed.

The small gap 18a between the abutment portions 18 of the metal tube 1b is slightly changed in accordance with an extra length control condition described separately and the method of setting the positioning unit 71 (A and B in FIG. 22). For example, when the state A in FIG. 22 is set, the size of the small gap 18a is increased. However, when the state B in FIG. 22 is set, the size tends to be reduced.

In practice, within the measurement mesh range of the present application, however, an influence of a change in the small gap 18a was found to rarely influence the welding result.

In order to set the rear bead width b within the predetermined range in this manner, focal point shifting (defocusing) of the laser beam radiated on the abutment portions 18 must be performed in accordance with the size of the metal tube 1b to control the radiation power density.

The welding rate is determined by a focused laser beam spot size, i.e., a focal point shift amount and an overlap ratio.

The size of the metal tube 1b is variously changed to conduct tests under a condition that the minimum value satisfies $b_{min} \geq 10d \pm 5$ ($\mu$m) and the maximum value of the rear bead width satisfies $b_{max} \leq 1000(t/2)$ and a condition that the minimum and maximum value do not satisfy $b_{min} \geq 10d \pm 5$ ($\mu$m) and $b_{max} \leq 1000(t/2)$. The welding rate V (m/min) is plotted along the abscissa and the focal point shift amount F (mm) is plotted along the ordinate. Test results are shown in FIGS. 11, 12, and 13. FIG. 11 shows a case wherein the metal tube 1b has an outer diameter d of 3.5 (mm) and a tube wall thickness t of 0.2 (mm). FIG. 12 shows a case wherein the metal tube 1b has an outer diameter d of 2.0 (mm) and a tube wall tube t of 0.15 (mm). FIG. 3 shows a case wherein the metal tube 1b has an outer diameter d of 1.0 (mm) and a tube wall thickness of 0.1 (mm). Referring to FIGS. 11 to 13, a circle indicates a case satisfying the above condition, and a cross indicates a case not satisfying the above condition. Their limits are represented by curves A and B. The curve A represents the minimum value $bmin=10d \pm 5$ ($\mu$m) of the optimal rear bead width. The curve B represents the maximum value $b_{max}=1000(t/2)$ of the optimal rear bead width.

As shown in FIG. 11, when the metal tube 1b has the outer diameter d of 3.5 (mm) and the tube wall thickness t of 0.2 (mm), the optimal range of the focal point shift amount F has a largest allowable value in the range of F=0.85 (mm) to F=1.45 (mm). By setting the focal point shift amount within this range and the welding rate v to 4 (m/min), welding can be performed stably for a long period of time without any influence of sputter components while the rear bead width b falls within the predetermined range of 40 to 100 ($\mu$m).

Similarly, when the metal tube 1b has the outer diameter d of 2.0 (mm) and the tube wall thickness t of 0.15 (mm), the focal point shift amount F is set to fall 6 within the range of 0.8 to 1.3 (mm). In this case, welding is performed while the welding rate v is set to (m/min). when the metal tube 1b has the outer diameter d of 1.0 (mm) and the tube wall thickness t of 0.1 (mm), the focal point shift amount F is set to fall within the range of 0.7 to 1.1 (mm). In this case, when the welding rate v is set to 10 (m/min), welding can be continuously and stably performed.

(4) Measurement and Drawing Step

The sealed metal tube 1c having the welded abutment portions 18, as described above, is supplied to the measurement unit 8. In the measurement unit 8, the passing speed, i.e., the welding rate v, of the metal tube 1c is measured by the speedometer 83 while the metal tube 1c is supported by the support roll stand 82. The welded state is checked by the eddy current probe 81.

The metal tube 1c passing through the eddy current probe 81 is drawn by the drawing means 9 to have a diameter corresponding to the outer diameter of the optical fiber cable 5 incorporated in the metal tube 1c, thereby obtaining the metal tube covered optical fiber cable 12. During drawing of the metal tube 1c by the drawing means 9, since only one guide tube 61 is inserted into the metal tube 1c just at the inlet side of the eddy current probe 81, and since the guide tube 61 does not extend up to the drawing means 9 the metal tube 1c can be made thin, and the diameter of the metal tube 1c can be easily reduced.

(5) Traction and Winding Step

The metal tube covered optical fiber cable drawn by the drawing means 9 is wound by the cable winding machine 10 through the tension variable means 11 and the tension adjusting means 13.

When the metal tube covered optical fiber cable 12 is to be wound, the sealed and diameter-reduced metal tube 1d must be engaged with the optical fiber cable 5. For this purpose, prior to a continuous operation, after the welded and sealed metal tube 1d is manually wound around the capstans 11a and 11b of the tension variable means 11 by a plurality of times, it is subjected to traction. The distal end of the metal tube 1d is mounted on the cable winding machine 10 through the tension adjusting means 13. In this state, the distal end of the optical fiber cable 5 is inserted just in front of the capstan 11a, and the metal tube 1d is pressed at this position, thereby engaging the optical fiber cable 5 with the inner wall of the metal tube 1d. Thereafter, the metal tube 1d is wound while the capstans 11 are driven. The optical fiber cable 5 together with the metal tube 1d is pulled from the guide tube 61, thereby winding the pulled product as the metal tube covered optical fiber cable 12. In the case where the optical fiber cable 5 and the metal tube 1d can be wound together around the capstan 11a, it is not necessary to engage the optical fiber cable 5 with the metal tube 1d by pressing that tube.

(6) Extra Length Control Step

When the metal tube covered optical fiber cable 12 is wounded around the capstans 11a and 11b and is subjected to traction, a tension acts due to a frictional force between the metal tube 1d of the metal tube covered optical fiber cable 12 and the capstans 11a and 11b. This frictional force is large at the initial period of winding and is gradually reduced. The tension is also large at the initial period of winding and is gradually reduced, accordingly. Elongation occurs in a wound portion of the metal tube 1d in correspondence with the tension.

Assume that, in a normal operation, the stainless steel strip 1 having a width of 4 mm and a thickness of 0.1 (mm) is used, that the strip 1 is formed into a metal tube 1c having an outer diameter of 1.3 (mm), and that the metal tube 1c is drawn into the metal tube 1d having an outer diameter of 1.0 (mm). In this case, when a tension of the metal strip 1 is adjusted by the tension adjusting means 14 such that a tension of the metal tube 1c at the inlet of the capstan 11a is set to about 20 (kgf), the tension causes elongation of the metal tube 1d by +0.30%. At this time, when the tension of the optical fiber cable 5 having an outer diameter of 125 (μm) is adjusted by the tension adjusting means 15 and a tension of about 25 (gf) acts on the inlet side of the capstan 11a, elongation occurs by +0.03%.

Figure 14:
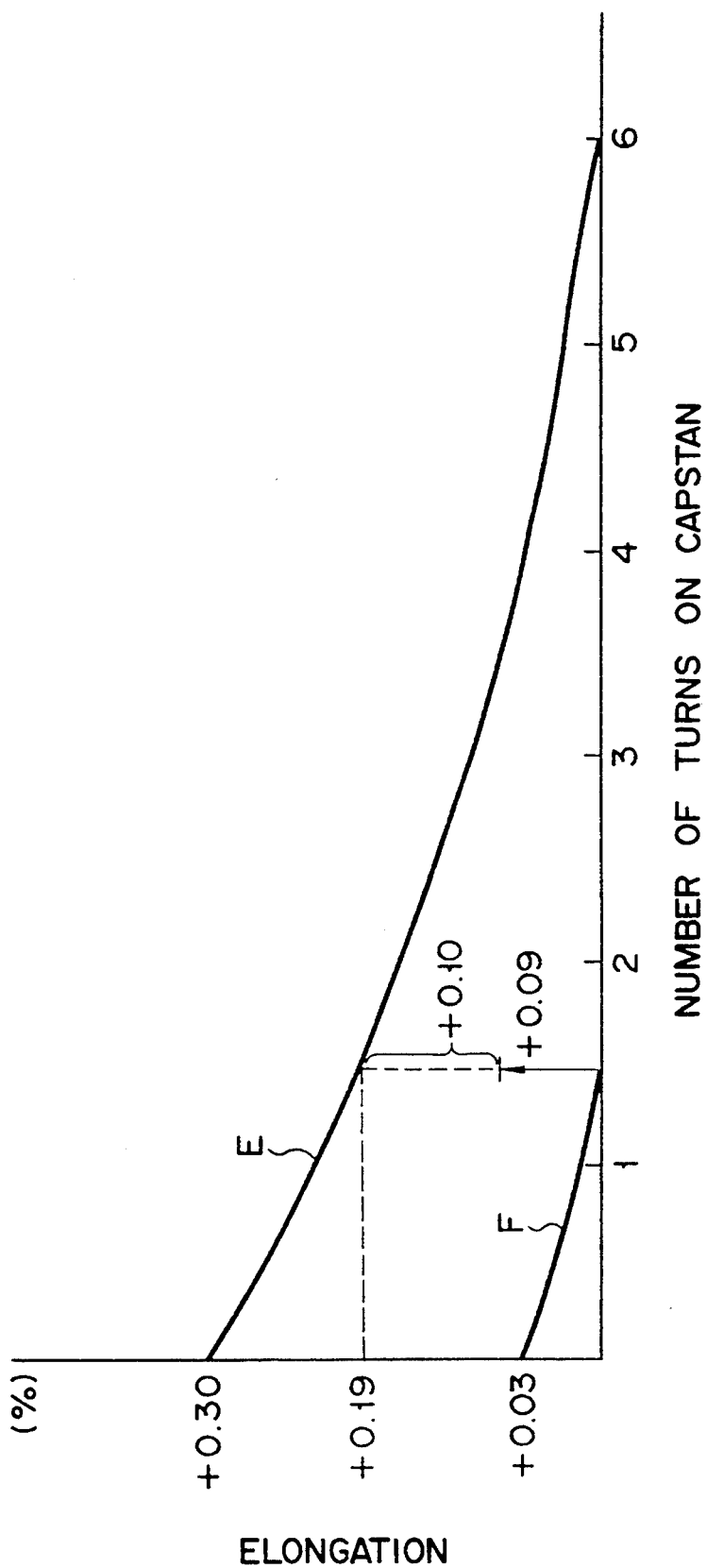

Degrees of elongation of the metal tube 1d and the optical fiber cable 5 are measured as a function of the number of turns of the metal tube 1d wound around the capstans 11a and 11b. The measurement results are shown in FIG. 14. The number of turns of the tube wound around the capstans 11a and 11b is plotted along the abscissa, and an elongation (%) of the metal tube 1d is plotted along the ordinate. Referring to FIG. 14, a curve E represents characteristics of changes in elongation of the metal tube 1d, and a curve F represents characteristics of changes in elongation of the optical fiber cable 5. As indicated by the curve E, when the metal tube 1d is wound around the capstans 11a and 11b six times, the final elongation of the metal tube 1d supplied to the tension adjusting means becomes very small. As indicated by the curve F, when the optical fiber cable 5 is wound one and half times, elongation is almost zero.

When the elongation of the optical fiber cable 5 becomes almost zero by its 1.5-time winding, an elongation of +0.19 is present in the metal tube 1d. Immediately after the metal tube 1d is wound around the capstans 11a and 11b six times, the tension of the metal tube 1d becomes almost zero. In this case, the elongation of the metal tube 1d becomes almost zero accordingly. That is, when the tube wound around the capstans six times, the metal tube 1d shrinks by 0.19% as compared with 1.5-time winding. On the other hand, since the tension of the optical fiber cable is almost zero upon 1.5-time winding, no change in elongation occurs, and the length of the optical fiber cable is kept unchanged. For this reason, 6-time winding causes an elongation of 0.19% in the optical fiber cable 5 as compared with the metal tube 1d.

The winding diameter of the metal tube 1d wound around the capstans 11a and 11b is different from that of the optical fiber cable 5 engaged with the inner wall of the metal tube 1d. For this reason, when the diameter of each of the capstans 11a and 11b is about 500 mm, the optical fiber cable 5 has an elongation amount corresponding to +0.09% with respect to the metal tube 1d. This elongation amount of 0.09% is canceled with the above 0.19%. As a result, the optical fiber cable 5 is longer than the metal tube 1d by 0.10%.

Assume that the tension of the metal tube 1d at the inlet side of the capstan 11a is the same as that shown in FIG. 14, and that the tension of the optical fiber cable 5 is changed to increase the tension at the inlet side of the capstan 11a. In this case, a change in elongation of the optical fiber cable 5 is indicated by a curve F1 in FIG. 15. When the optical fiber cable 5 is wound around the capstans 11a and 11b 3.5 times, the tension is almost zero. On the other hand, the elongation of the metal tube 1d is 0.09% in 3.5-time winding. When the elongation of 0.09% of the metal tube 1d is canceled with the elongation of 0.09% of the optical fiber cable 5, a difference between the lengths of these members, i.e., an extra length, becomes 0%.

Figure 15:
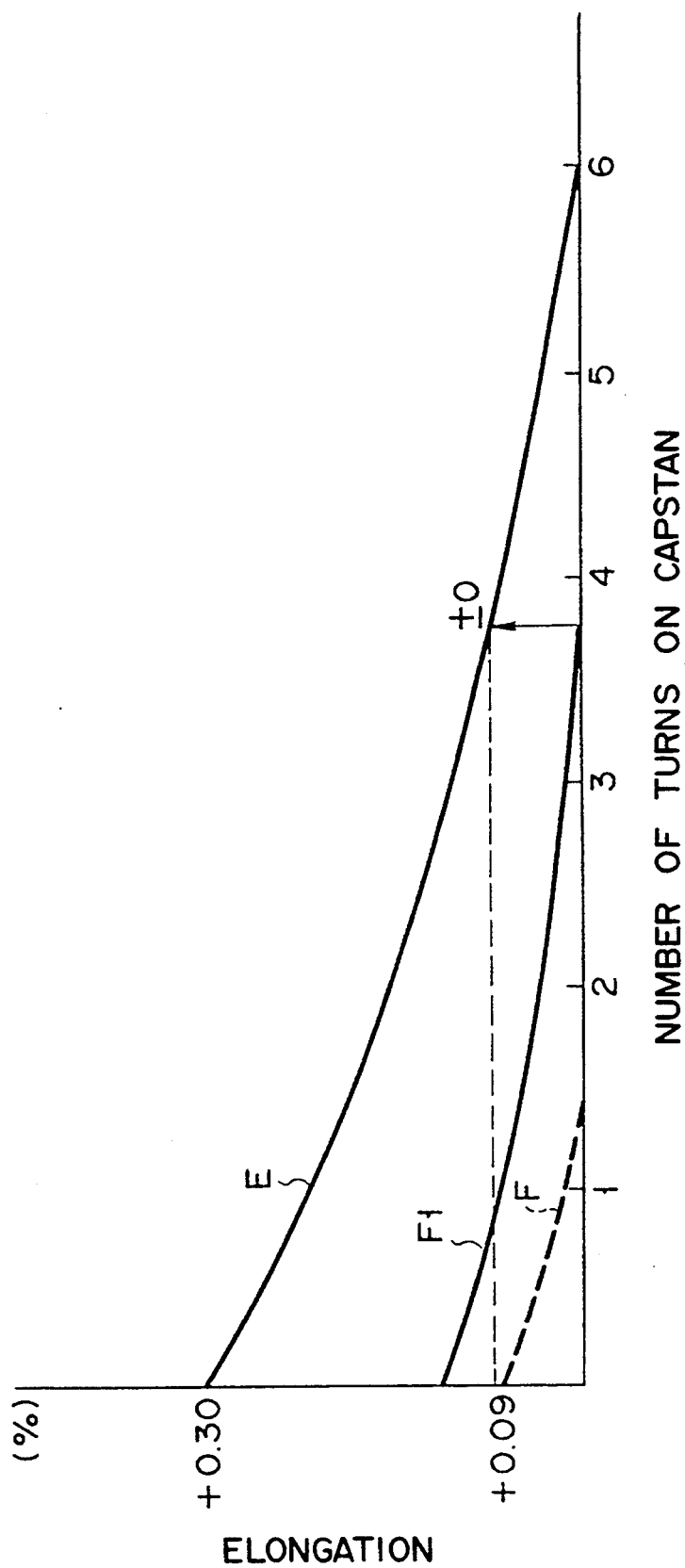

Contrary to the case in FIG. 15, when a tension of the metal tube 1d at the inlet side of the capstan 11a is increased by applying a tension of the metal strip 1 by the tension adjusting means while the tension of the optical fiber cable 5 at the inlet of the capstan 11a is kept unchanged, a change in elongation in metal tube 1d is represented by a curve E1 in FIG. 16.

Assume that the tension of the metal tube 1d at the inlet side of the capstan 11a is set equal to that in FIG. 14, and that a tension of the metal tube 1d at the outlet sides of the capstans 11a and 11b are increased by the tension adjusting means 14. In this case, a change in elongation of the metal tube 1d is represented by a curve E2 in FIG. 16. A curve E3 in FIG. 16 represents a case wherein the tensions of the metal tube 1d at the inlet and outlet sides of the capstans 11a and 11b are increased.

As described above, one or both of the tensions of the metal tube 1d at the inlet and outlet sides of the capstans 11a and 11b are increased, or both the tensions are increased by a predetermined value. In this case, the length of the optical fiber cable 5 can be larger than that of the metal tube 1d by a desired amount. For example, as indicated by the curve E3, when the metal tube 1d is wound around the capstans 11a and 11b by one and half times, the elongation of the metal tube 1d becomes +0.26%. Even if the elongation of 0.09% of the optical fiber cable 5, which is caused by the winding diameter, is subtracted from the elongation of the metal tube 1d, the optical fiber cable 5 is longer than the metal tube 1d by 0.17% at the outlet side of the capstan.

Figure 17:
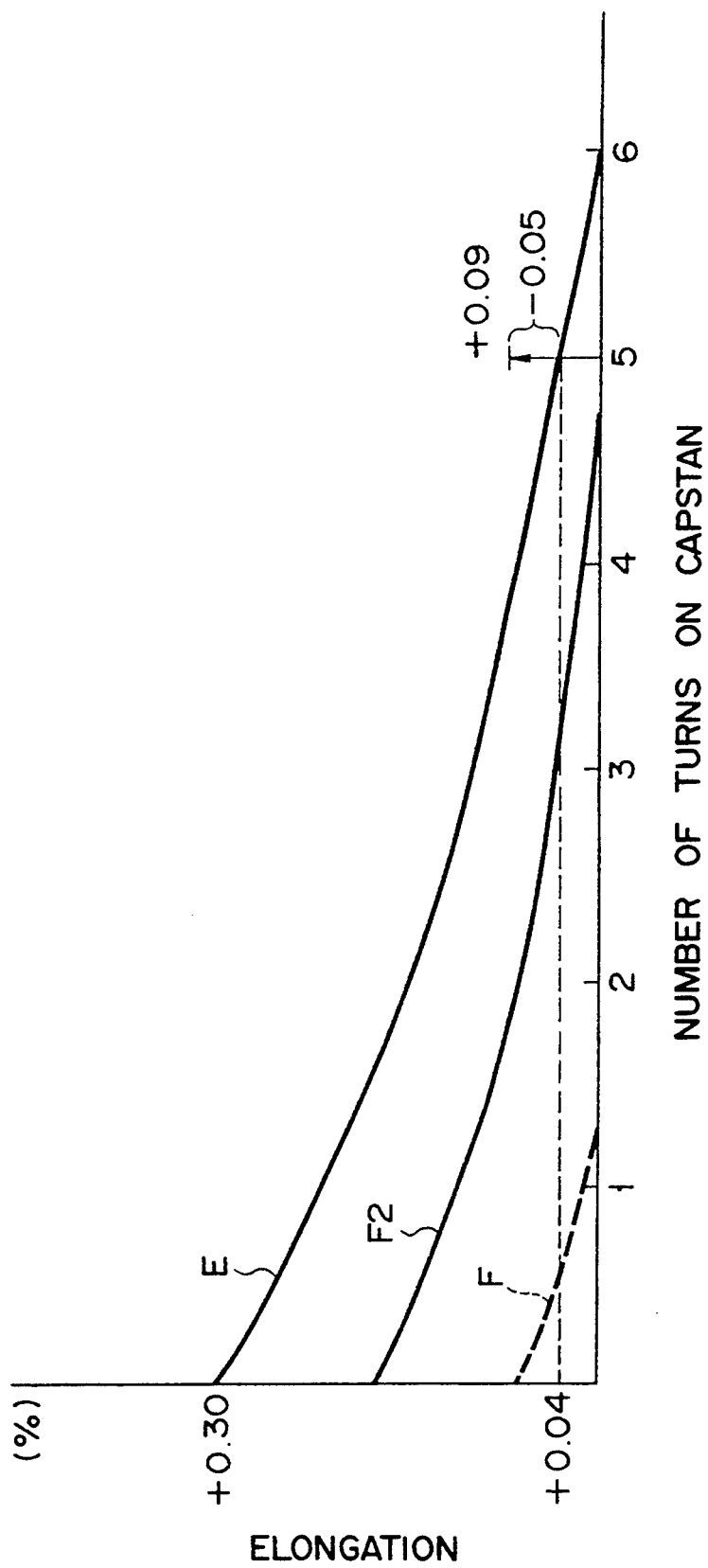

When a tension of the optical fiber cable 5 at the inlet side of the capstan is set larger than that in FIG. 15, and a change in elongation of the optical fiber cable 5 is represented by a curve F2 in FIG. 17, the length of the optical fiber cable 5 can be set smaller than that of the metal tube 1d. In this case, the elongation of the optical fiber cable 5 becomes zero in 5-time winding, and the corresponding elongation of the metal tube 1d becomes +0.04%. This elongation of +0.04% is subtracted from the winding difference of 0.09% in the optical fiber cable 5. Therefore, the optical fiber cable 5 can be set shorter than the metal tube 1d by 0.05%.

As described above, by systematically adjusting the capstans 11a and 11b wound with the metal tube covered optical fiber cable 12 by a plurality of times, the tension adjusting means 14 for the metal strip 1, and the tension adjusting means 15 for the optical fiber cable 5, and occasionally the tension adjusting means 13 for the metal tube covered optical fiber cable 12, the length of the optical fiber cable 5 relative to the metal tube 1d can be arbitrarily adjusted. When the tensions of the metal tubes 1c and 1d are adjusted by adjusting the positioning unit 71 as in the tension adjusting means 14 for the metal strip 1, extra length control can be more precisely performed. In this case, the extra length control function of the positioning unit 71 is the same as that of the tension adjusting means 14 of the metal strip, and a detailed description thereof will not be made.

As described above, the metal tube covered optical fiber cable 12 is manufactured while the extra length is controlled to a predetermined length.

In the above embodiment, argon gas is used as an inert gas. However, nitrogen gas may be used to obtain the same effect as described above.

In the above embodiment, a gel is not supplied to a metal tube for covering the optical fiber cable. When the gel is supplied to the metal tube, a gel is supplied from the insert gas supply tube 63 in the optical fiber cable guide means 6. In this manner, the gel can be supplied to the metal tube 1d by utilizing only one guide tube 61.

In this case, the inert gas and gel are supplied at a pressure which does not apply a tension on the optical fiber cable 5 by the inert gas or gel flow because insertion of the optical fiber cable 5 and extra length control can be achieved, as they are desired, without supplying the inert gas and gel through the optical fiber cable guide means 6.

In the above embodiment, the optical fiber cable guide means 6 is arranged between the first and second assemblies 3a and 4 of the assembly 2. However, as shown in FIG. 18, the optical fiber cable guide mean 6 may be arranged at the inlet of the first assembly 3, and the guide tube 61 may be inserted at the inlet of the first forming roller pair 31a.

In each embodiment described above, one optical fiber cable is inserted into a metal tube. However, an optical fiber bundle consisting of a plurality of optical fibers can also be guided into a metal tube in the same manner as described above.

As described above, according to the present invention, an optical fiber cable is guided into a metal tube by a guide tube also serving as a heat-insulating member, and the guide tube is brought into contact with the inner wall of the metal tube at a position opposite to the abutment portions of the metal tube. The welding heat influence on the optical fiber cable can be reduced, and an increase in temperature of the optical fiber cable can be reduced. Therefore, thermal damage to the optical fiber cable can be prevented.

The guide tube is located in the laser welding portion at a position opposite to the abutment portions of the metal tube, and a gap is formed between the abutment portions and the guide tube so that a space in which sputter components produced during welding can be deposited can be assured. Therefore, the metal tube can be continuously welded for a long period of time.

The focal position of the laser beam for welding the abutment portions of the metal tube is shifted outside the range of the abutment portions and is moved inside the metal tube, an excessive increase in radiation power density of the laser beam can be prevented, and at the same time the welding width can be set almost constant. Therefore, welding free from defects in the abutment portions of the metal tube can be performed.

The maximum value of the focal point shift amount of the laser beam emitted from laser radiation means is determined in accordance with the minimum value of the rear bead width determined by the outer diameter of the metal tube, the minimum value of the focal point shift amount is determined by the maximum value of the rear bead width determined by the wall thickness of the metal tube, the welding rate is set in accordance with the determined maximum and minimum values of the focal point shift amount, and the laser beam is radiated while focal point shifting is being performed within the range of the focal point shift amount. Therefore, welding can be performed at an optimal radiation power density corresponding to the size of the metal tube, the rear bead width can fall within the predetermined range, production of the sputter components can be suppressed, and a long-term operation can be stably performed.

We claim:

1. A method of manufacturing an optical fiber cable covered with a metal tube, comprising the steps of: causing both side edges of a metal strip to be subjected to traction and forming the metal strip into a metal tube with said side edges facing each other, the metal tube having abutment portions along said facing side edges;
   guiding an optical fiber or an optical fiber bundle into the formed metal tube; and
   welding the abutment portions of the metal tube with a laser beam to seal the abutment portions;
   wherein said guiding step comprises guiding the optical fiber or the optical fiber bundle into the metal tube through a guide tube which is provided across a welding position.

2. The method of claim 1, wherein the guiding step further comprises elastically urging the guide tube against an inner wall of the metal tube at a position opposite to a laser beam radiation surface.

3. The method of claim 2, wherein in said welding step, a focal point of the laser beam is positioned to fall above the abutment portions of the metal tube.

4. The method of claim 1, wherein in said welding step, a focal point of the laser beam is positioned to fall above the abutment portions of the metal tube.

5. The method of claim 2, wherein in said welding step, a focal point of the laser beam is positioned to fall below the abutment portions of the metal tube.

6. The method of claim 1, wherein in said welding step, a focal point of the laser beam is positioned to fall below the abutment portions of the metal tube.

* * * * *